A. L. MORTON.
FRUIT CUTTING AND PITTING MACHINE.
APPLICATION FILED SEPT. 19, 1912.

1,079,573.

Patented Nov. 25, 1913.
2 SHEETS—SHEET 1.

Fig. 2.

Fig. 1.

WITNESSES:
Charles Pickles
F. E. Maynard.

INVENTOR
Arthur L. Morton,
BY G. H. Strong.
ATTORNEY

A. L. MORTON.
FRUIT CUTTING AND PITTING MACHINE.
APPLICATION FILED SEPT. 19, 1912.
1,079,573.
Patented Nov. 25, 1913.
2 SHEETS—SHEET 2.
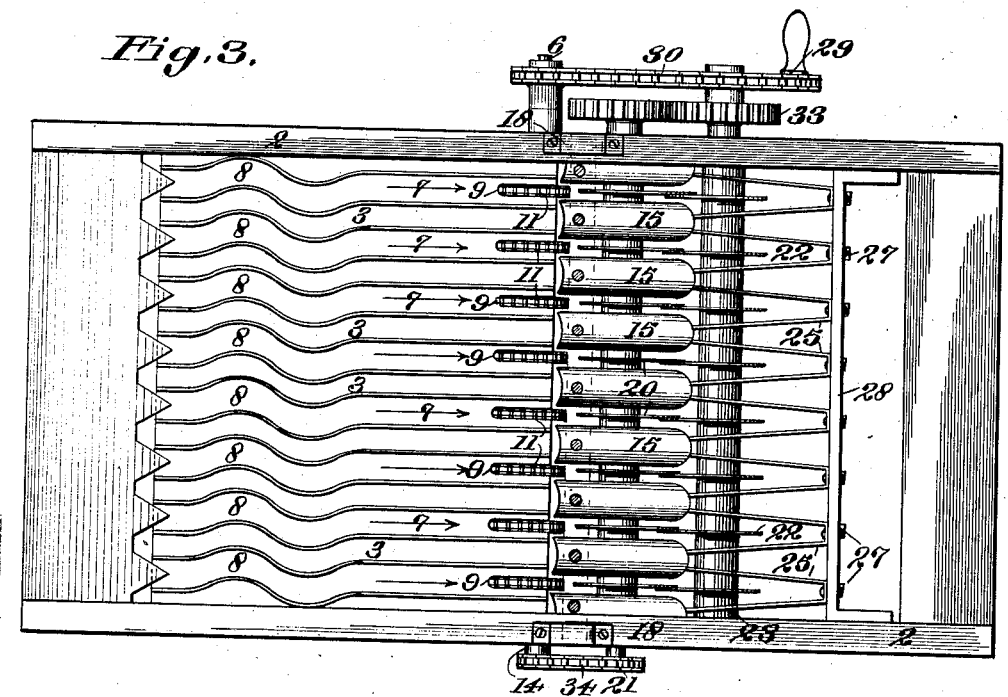
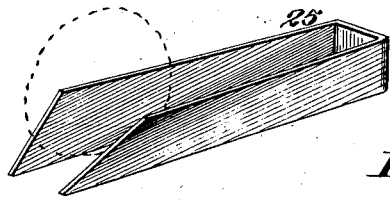
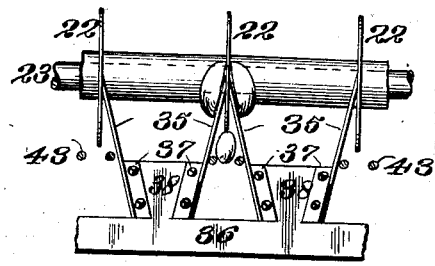
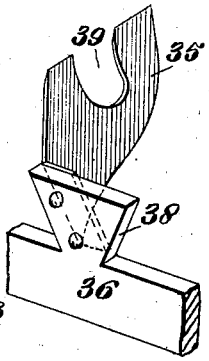
WITNESSES:
Charles Pickles
F. E. Maynard
INVENTOR
Arthur L. Morton,
BY G. H. Strong.
ATTORNEY

UNITED STATES PATENT OFFICE.

ARTHUR L. MORTON, OF MOUNTAIN VIEW, CALIFORNIA.

FRUIT CUTTING AND PITTING MACHINE.

1,079,573.   Specification of Letters Patent.   Patented Nov. 25, 1913.

Application filed September 19, 1912. Serial No. 721,196.

*To all whom it may concern:*

Be it known that I, ARTHUR L. MORTON, a citizen of the United States, residing at Mountain View, in the county of Santa Clara and State of California, have invented new and useful Improvements in Fruit Cutting and Pitting Machines, of which the following is a specification.

This invention relates to fruit cutting and pitting machines.

The object of the present invention is to provide an apparatus in which fruit may be severed and pitted; and particularly to provide in fruit cutting apparatus means for so positioning the fruit to be cut that its circumferential crease will assume a plane in common with the plane of cutters; and to provide means for feeding the fruit to the cutters. The apparatus also includes means for separating the pits or stones and the meat of the fruit, with automatically operating fingers for dislodging any sections of fruit which may possibly become jammed or clogged during the operation.

The invention consists of the parts and the construction and combination of parts as hereinafter more fully described and claimed, having reference to the accompanying drawings, in which—

Figure 1 is a central, vertical, longitudinal section stationary guides. Fig. 2 is a perspective view of a fragment of the positioning device. Fig. 3 is a plan view of the apparatus. Fig. 4 is a front elevation of a portion of the cutting and separating structure. Fig. 5 is a perspective view of one of the diverting plates. Fig. 6 is a perspective view of a yieldable throat plate.

In its illustrated embodiment or form, my invention comprises a suitable frame 2, having at one end an inclined reciprocating feeder 3 which may be supported by suitable springs or other equivalent devices 4; the feeder being connected by one or more connecting-rods 5 to a crank or other shaft 6 mounted in appropriate bearings in the frame 2.

The feeding hopper or tray 3 is of peculiar formation and design, having for its function the rapid arrangement or positioning of fruit, such as apricots, peaches, plums, pears, or other fruit, so that in certain instances, as when treating apricots, the crease of the fruit will be arranged in the plane, substantially, of subsequent cutting devices to be hereinafter described. This rapid accomplishment of the positioning or arrangement of the fruit is produced by forming in the feeding device 3 a plurality of substantially parallel convolutions 7; the fruit entering ends of which being provided with zigzag, curved portions 8, which I have found in actual experience serve to rapidly bring the fruit to the desired position so that a comparatively short feed table or hopper 3 may be employed, thus saving floor space occupied by the machine and further in the reduction in cost of the apparatus by reducing its general overall proportions and the lengths of the parts involved.

The lower end of the feed hopper or plate 3 is preferably formed of comparatively thin material, as a casting or stamped piece, with openings or serrations 9 extending somewhat along the bottom of the convolutions 7 of the plate, and through which openings project feeding teeth 10 on a flexible conveyer or belt 11, of which there is one for each of the openings 9; the conveyer chains or belts being driven by appropriate sprocket wheels 12, mounted on shafts 13—14 extending across the frame 2 of the machine. One or the other of the shafts 13—14 may be driven by appropriate connections, so that the conveyer chains 11 will operate to carry successively, the projecting spurs or points 10 upwardly through the serrations 9 of the feed plate, and thus in proper order feed fruit, singly, from each channel between stationary guide devices 15 which are suitably spaced from each other and adjustably mounted, with relation to the conveyers 11, by means of a transverse bar 16, connected by a locking device 17 to bearings 18.

Projecting sufficiently upwardly between the stationary guide bars or rails 15, which are substantially parallel, is a series of cutters 20, arranged in parallelism at suitable distances along a shaft 21, mounted transversely in the frame 2. Mounted in close parallel position to the cutters 20 are similar cutters 22, mounted on a shaft 23 journaled transversely in the frame 2. The shafts 21—23 rotate toward each other and carry the cutters around, so that when a fruit is deposited upon the upper edges, which are spiral, of the cutters, these will gradually roll or bite into the imposed fruit. The continued rotation of the cutters severs the fruit until finally radial shoulders 24 of coördinate pairs of cutters register in overlapping position and substantially encompass the fruit stone or pit and carry the latter downwardly, independently of the severed fruit.

For the purpose of yieldably receiving and temporarily supporting fruit fed by the conveyers 11 to the spaces between the fixed guides 15, I provide flexible jaw devices, as 25, illustrated in perspective in Fig. 6, which are secured at one end by bolts 27 to a transverse bar 28; the projecting sides or arms of the yoke 25 extending close to the ends of the fixed rails or guides 15, so that when fruit rolls from the guides into position over the coördinate sets of cutters, the flexible side arms or jaws of the yoke 25 will yieldably embrace the fruit. As the cutters revolve and bite into the fruit, the fruit being drawn downwardly by the cutters will expand the jaws of the yoke 25, and when the fruit is finally severed the jaws will automatically return into normal receiving position.

Power may be applied to operate the shafts 21 and 23, which carry the cutters, by any appropriate means, and I have shown the shaft 23 as provided with a crank wheel 29, which in this instance drives a sprocket chain 30 running over to transverse shaft 6 which carries one or more cranks 32. To the cranks 32 are connected the pitman rods or devices 5 whereby, upon the rotation of the crank-shaft 6, the feeding hopper 3 will be reciprocated to eject the fruit as it is charged to the plate 3 and the fruit is subsequently positioned for proper presentment to the cutters. The shafts 21 and 23 are operated in unison of speed by means of gears or equivalent means 33, and power may be transmitted from the driven shaft 21 to the conveyer shaft 14 by means of suitable gearing or sprocket chain connection 34, all shown in Fig. 3.

From the foregoing it will be seen that, by turning the crank-wheel 29, motion is imparted to the cutter shafts 21 and 23 to carry the cutters in coöperative relation to sever the fruit, and so that the substantially radial shoulders 24 of the cutters will register in proper time to override the pit of the fruit being severed; power being transmitted also from the driving-shaft 23 to the crank-shaft 6. Power to drive the conveyer shafts 13—14 is derived from the shaft 21 through means of the transmission device 34.

The meat of the fruit severed and the pits thereof are diverted into separate channels while being severed by means of inclined diverged walls or guides 35, Fig. 5, which are removably attached to a transverse hanger or bar 36 of the frame 2 by means of screws 37. The bar 36 has upwardly projecting lugs or bearings 38, the side edges of which are inclined at such an angle that the upper broader edges of the several guide plates 35 rest against the sides of the adjacent portions of the cutters 20—22; that is, the upper ends of the guides 35 assume a position approximately on a plane between the centers of the cutter shafts 21 and 23. As a fruit is being cut, the partly severed sections approach and straddle the convergent portions of adjacent sets of the guide plates 35, the upper portions of which bear upon the opposite sides of a coördinate set of cutters.

The guide plates 35 are shown as each with a suitable aperture or opening 39 in the upper portion; the purpose of this being to provide a throat formed by two adjacent plates 35, through which the stone of the fruit will be precipitated by the cutters when the fruit is finally severed. The severed sections straddle the coöperative pairs of plates 35, as clearly shown in Fig. 4; the sections of the fruit sliding down the convergent sides of opposite plates onto a suitable discharge board or chute 40. Meanwhile, the stones of the fruit dropping through the throat formed by the openings 39 of the plates 35 fall to an oppositely disposed discharge board 41 by which they may be precipitated into a removable collecting device 42.

For the purpose of preventing a clogging of sections of fruit for any cause in or on the throat plates 35, I introduce yieldable fingers or ejectors 43 which are adapted to engage the undersides of adjacent throat plates 35; the fingers 43 being connected to a saddle or carrier 44 which is adapted to rock upon a suitable support or shaft 45 mounted transversely the frame 2, and which may be oscillated through a suitable driving connection, as a link or links 46, connected to crank or eccentric portions 47 of one or the other of the conveyer shafts, as 13. During the oscillations of the fingers or ejectors, these will wipe the under surfaces of the throat plates 35, passing sufficiently high across the throat apertures 39 to lift therefrom any particles or sections of fruit which may become embedded or lodged thereon. As soon as they are dislodged they will gravitate down the throat plates 35 onto the chute 40.

Having thus described my invention, what I claim and desire to secure by Letters Patent is—

1. In a fruit handling machine, a device for arranging fruit in a given position, said device comprising an inclined member having a plurality of substantially parallel corrugations, portions of which are transversely zigzag for the purpose of rapidly arranging a quantity of fruit in the desired position, and stationary guides forming channels in alinement with the channels of the corrugations.

2. In a fruit handling machine, a device for arranging fruit in a given position, said device comprising an inclined member having a plurality of substantially parallel corrugations, portions of which are transversely zigzag for the purpose of rapidly arranging the fruit in the desired position, supporting springs for giving the device an upward throw, and means for reciprocating said member on the springs.

3. In a fruit handling machine, a device for arranging fruit in a given position, said device comprising a member having a plurality of substantially parallel corrugations, portions of which are transversely zigzag for the purpose of rapidly arranging the fruit in the desired position, said member being provided with serrations at the bottom portions of the corrugations adjacent to one end, stationary channel forming guides, and a fruit conveyer running through the serrations in said member and to said guides.

4. In a fruit handling machine, the combination with a reciprocating feeding member, of stationary spaced guides forming channels into which the fruit from the feeding member is carried, a conveyer for delivering the fruit in given order from the moving feed member to the stationary guides, yieldable receiving devices, the arms of which are disposed adjacent to the ends of the stationary guides, and rotary cutters arranged in coöperative sets operating in the channels formed between the stationary guides and the receiving devices.

5. In a fruit handling machine, the combination with a reciprocating feeding member, of stationary spaced guides forming channels into which the fruit from the feeding member is carried, a conveyer for delivering the fruit in given order from the moving feed member to the stationary guides, yieldable receiving devices, the arms of which are disposed adjacent to the ends of the stationary guides, rotary cutters arranged in coöperative sets operating in the channels formed between the stationary guides and the receiving devices, and stationary throat plates arranged in sets to form throats below the cutter sets through which pits from the fruit are precipitated, said throat plates forming diverting walls for the fruit sections.

6. In a fruit handling machine, the combination with a reciprocating feeding member, of stationary spaced guides forming channels into which the fruit from the feeding member is carried, a conveyer for delivering the fruit in given order from the moving feed member to the stationary guides, yieldable receiving devices, the arms of which are disposed adjacent to the ends of the stationary guides, rotary cutters arranged in coöperative sets operating in the channels formed between the stationary guides and the receiving devices, stationary throat plates arranged in sets to form throats below the cutter sets through which throats from the fruit are precipitated, said throat plates forming diverting walls for the fruit sections, and movable ejectors adapted to operate in the throats formed by the throat plates to dislodge such sections of the fruit as may momentarily choke in the throat plates.

7. In a fruit handling machine, a reciprocating inclined feeder with zigzag parallel channels, resilient supporting and thrust members for the feeder, means for actuating the feeder, and an adjustable inclined device forming channels in continuation of the feeder channels.

8. In a fruit handling machine, a reciprocating inclined feeder with zigzag parallel channels, resilient supporting and thrust members for the feeder, means for actuating the feeder, an adjustable inclined device forming channels in continuation of the feeder channels, and means for intermittently conveying fruit from the reciprocating feeder to the device.

9. A fruit slicing mechanism including a pair of coöperative cutters, and inclined rigid plates with forward and rearward edges bearing on opposite sides of the cutters and having combined apertures large enough for a fruit pit to pass through, but too small for the cut fruit.

10. A fruit slicing mechanism including a device for diverting the fruit sections and segregating the pits, said device comprising immovable plates with straight edges and converging at an angle and having the proximate edges slotted to form when combined a throat, said plates acting wedge fashion upon a sliced fruit to separate the sections, the pit passing through the coordinate apertures, and rotary cutters against which the adjacent edges of said plates bear on opposite sides.

11. A fruit slicing mechanism including a device for diverting the fruit sections and segregating the pits, said device comprising plates converging at an angle and having the proximate edges provided with apertures, said plates acting wedge fashion upon a sliced fruit to separate the sections, the pit passing through the coördinate apertures, and means movable upon the lower surfaces of the plates for clearing the plates of lodged fruit substance.

In testimony whereof I have hereunto set my hand in the presence of two subscribing witnesses.

ARTHUR L. MORTON.

Witnesses:
FRANCIS JACKSON,
EDWARD F. JOHNSON.